(12) United States Patent
Matsuda et al.

(10) Patent No.: US 6,861,787 B2
(45) Date of Patent: Mar. 1, 2005

(54) ULTRAVIOLET RAY LAMP AND STERILIZERS AND CLEANERS USING THE LAMP

(75) Inventors: Ryoutarou Matsuda, Kanagawa-ken (JP); Ariyoshi Ishizaki, Kanagawa-ken (JP); Akiko Saito, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 162 days.

(21) Appl. No.: 09/805,144

(22) Filed: Mar. 14, 2001

(65) Prior Publication Data
US 2002/0024278 A1 Feb. 28, 2002

(30) Foreign Application Priority Data
Mar. 14, 2000 (JP) .......................................... 2000-071247
Dec. 27, 2000 (JP) .......................................... 2000-397228

(51) Int. Cl.[7] .................................................. H01J 5/16
(52) U.S. Cl. ........................ 313/112; 313/573; 313/635
(58) Field of Search ................................ 313/112, 489, 313/573, 635; 359/885

(56) References Cited
U.S. PATENT DOCUMENTS 3,624,444 A * 11/1971 Berthold et al. ............ 313/161
5,619,096 A * 4/1997 Kaliszewski et al. ....... 313/489
5,753,999 A * 5/1998 Roozekrans et al. ........ 313/489
5,801,482 A * 9/1998 Verhaar et al. ............. 313/483

* cited by examiner

Primary Examiner—Ashok Patel
(74) Attorney, Agent, or Firm—Pillsbury Winthrop LLP

(57) ABSTRACT

An ultraviolet ray lamp includes a discharge vessel made of quartz glass, filled with a filling. A pair of electrodes is able to generate a discharge in the discharge vessel. An optical filter made of metal oxide, which is partly formed on the outer surface of the discharge vessel, transmits ultraviolet rays of long wavelength and cuts off ultraviolet rays of short wavelength. Furthermore, A device for generating ultraviolet rays includes an ultraviolet ray lamp generating ultraviolet rays including short and long wavelength, having a discharge vessel made of quartz glass. An enclosure accommodates the discharge vessel, transmitting at least ultraviolet ray of short wavelength. An optical filter made of metal oxide, which is partly formed on at least one side of the surface of the enclosure, transmits ultraviolet rays of long wavelength and cuts off ultraviolet rays of short wavelength. An ultraviolet ray lamp or a device for generating ultraviolet rays may be used for a sterilizer, an apparatus for treating fluid, or an air cleaner.

4 Claims, 8 Drawing Sheets

ULTRAVIOLET RAY LAMP AND STERILIZERS AND CLEANERS USING THE LAMP

BACKGROUND OF THE INVENTION

1. Field of Invention

The present inventions relate in general to ultraviolet ray lamps and to sterilizers and cleaners using ultraviolet light. More specifically, the inventions described herein feature ultraviolet ray lamps having a predetermined spectrum of wavelengths.

2. General Background and Related Art

Various devices and apparatus, such as sterilizes, utilize ultraviolet ray lamps. Generally, an apparatus for treating fluid, such as a sterilizer, or an air cleaner utilizes an ultraviolet ray lamp. It is desired that such apparatus effectively remove or decompose harmful ingredients. Usually, an apparatus for treating water includes a water tank for collecting water including harmful ingredients. An ultraviolet ray lamp is arranged in proximity to the water and irradiates ultraviolet rays into the water in order to remove or decompose harmful contaminants.

An ultraviolet ray lamp of this type comprises an ultraviolet rays-transmitting glass bulb made of soft glass, or quartz glass. The transmittance of quartz glass is higher than that of soft glass, so quartz glass is usually used for the glass bulb.

An ultraviolet ray lamp having quartz glass bulb can irradiate ultraviolet rays having wavelengths of 254 nm and 185 nm. Ultraviolet rays of 185 nm decompose molecular oxygen ($O_2$) of air into atomic oxygen (O). Then, atomic oxygen (O) bonds with molecular oxygen ($O_2$), to form ozone. Ozone is a sterilizer, however it is harmful to our health at a strong concentration. The concentration of ozone is preferably maintained at 0.1 ppm or less to minimize health risk. For example, in case of a sterilizer or an air cleaner using an ultraviolet ray lamp, if the apparatus is set up indoors, ozone generated causes a bad smell. It is also harmful to health to have too strong a concentration of ozone.

Japanese Laid Open Patent Application HEI 10-69886 discloses an arrangement for minimizing the production of ozone. It includes a quartz glass bulb (hereafter referred to as 'ozone-less quartz glass') containing titanium oxide ($TiO_2$), or cerium oxide ($CeO_2$) and a zirconium oxide ($ZrO_2$) film formed on the inner surface of the quartz glass bulb. The ozone-less quartz glass can transmit ultraviolet rays of 254 nm that are generated by mercury (Hg), but do not easily transmit ultraviolet rays of 185 nm that are generated by mercury (Hg). The ozone-less quartz glass has a characteristic of absorbing ultraviolet rays of 220 nm or less because, for example, titanium oxide ($TiO_2$) contained in the quartz glass bulb, absorbs ultraviolet rays of the comparatively short wavelength. However, if titanium oxide ($TiO_2$) is excessively contained in the quartz glass, titanium oxide ($TiO_2$) starts to absorb ultraviolet rays of the comparatively long wavelength. Therefore, the quantity of the titanium oxide ($TiO_2$) is exactly controlled to ten PPM or less. In the case of utilizing ozone-less glass, ultraviolet rays of 185 nm are absorbed at the inner surface of the glass bulb, so that its ultraviolet rays do not reach the outer surface of the glass bulb.

In general, it is known that ozone-less quartz glass tends to shrink when it is bombarded with ultraviolet rays of 185 nm. When using ozone-less quartz glass, the glass bulb shrinks at its inner surface, but does not shrink at its outer surface. Therefore, a strain occurs on the surface of the glass bulb. If there is a flaw on the outer surface of the bulb when it is manufactured, the bulb may crack due to the strain when it is operated. Because the zirconium oxide ($ZrO_2$) film absorbs ultraviolet rays of 185 nm, the ozone-less quartz glass bulb does not strain easily and is less likely to crack.

However, the above-described ultraviolet ray lamp cuts off most of the ultraviolet rays of 185 nm. Thus, the ultraviolet ray lamp, which does not easily crack, is not very efficient at producing ozone generated by ultraviolet rays of 185 nm in order to sterilize.

SUMMARY

According to one aspect of the invention, an ultraviolet ray lamp comprises a discharge vessel made of quartz glass having a filling gas therein. A pair of electrodes is able to generate a discharge in the discharge vessel. An optical filter made of metal oxide, which is partly formed on the outer surface of the discharge vessel, transmits ultraviolet rays of long wavelength and cuts off ultraviolet rays of short wavelength.

According to another aspect of the invention, a device for generating ultraviolet rays comprises an ultraviolet ray lamp generating ultraviolet rays including short and long wavelength, having a discharge vessel made of quartz glass. An enclosure accommodates the discharge vessel, transmitting at least ultraviolet ray of short wavelength. An optical filter made of metal oxide, which is partly formed on at least one side of the surface of the enclosure, transmits ultraviolet rays of long wavelength and cuts off ultraviolet rays of short wavelength.

According to another aspect of the invention, a sterilizer comprises the device for generating ultraviolet rays having the ultraviolet ray lamp. A holder supports the ultraviolet ray lamp. A body fixes the holder, and accommodates the ultraviolet ray lamp.

According to another aspect of the invention, a sterilizer comprises the ultraviolet ray lamp. A holder supports the ultraviolet ray lamp. A body fixes the holder, and accommodates the ultraviolet ray lamp.

According to another aspect of the invention, an apparatus for treating water comprises the device for generating ultraviolet rays having an ultraviolet ray lamp. A holder supports the ultraviolet ray lamp. A water tank fixes the holder, and accommodates the ultraviolet ray lamp. A blower supplies air to the tank.

According to another aspect of the invention, an air cleaner comprises an ultraviolet ray lamp housed in a case. A blower causes airflow through an intake of the case, past the lamp and out of an exhaust.

These and other aspects of the invention are further described in the following drawings and detailed descriptions of the invention.

BRIEF DESCRIPTION OF THE DRAWINGS

The invention will be described in more detail by way of examples illustrated by drawings in which.

DETAILED DESCRIPTION

Figure 2:
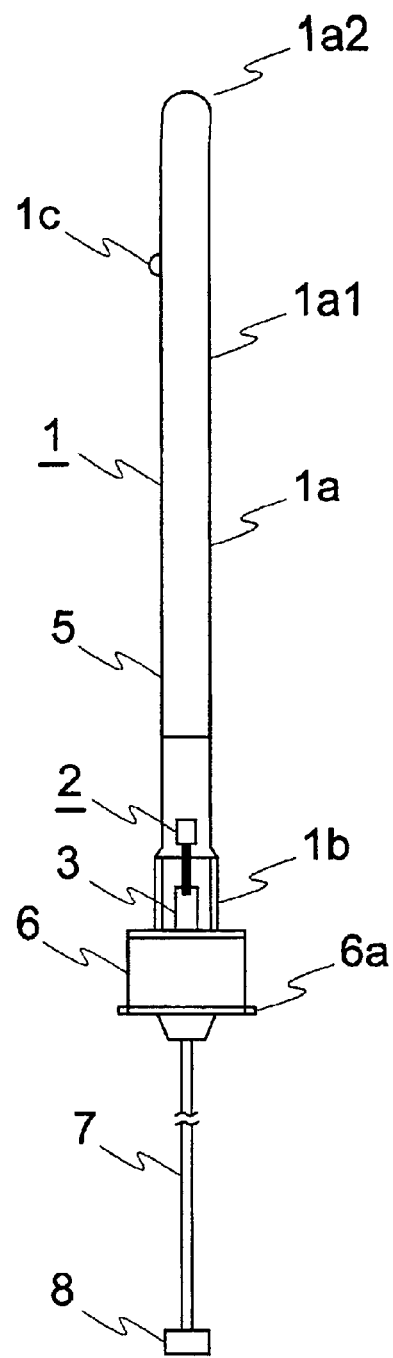
FIG. 2 is a side view of the ultraviolet ray lamp shown in FIG. 1.
Figure 3:
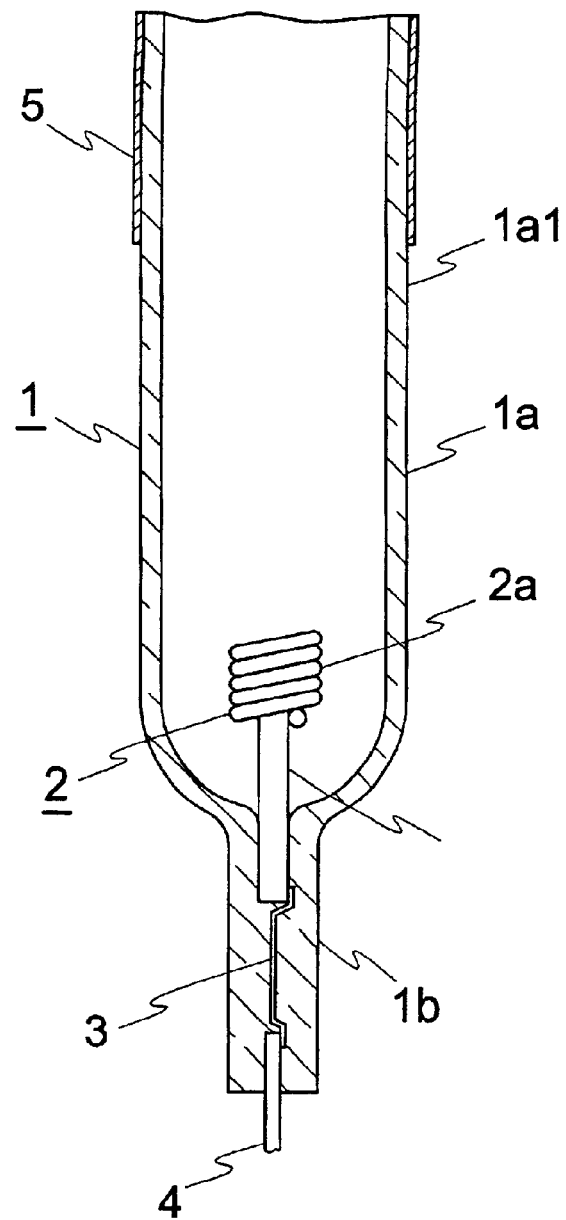
FIG. 3 is an enlarged longitudinal section of the ultraviolet ray lamp shown in FIG. 1.

A first exemplary embodiment of the invention will be explained referring to FIGS. 1 to 3.

Figure 1:
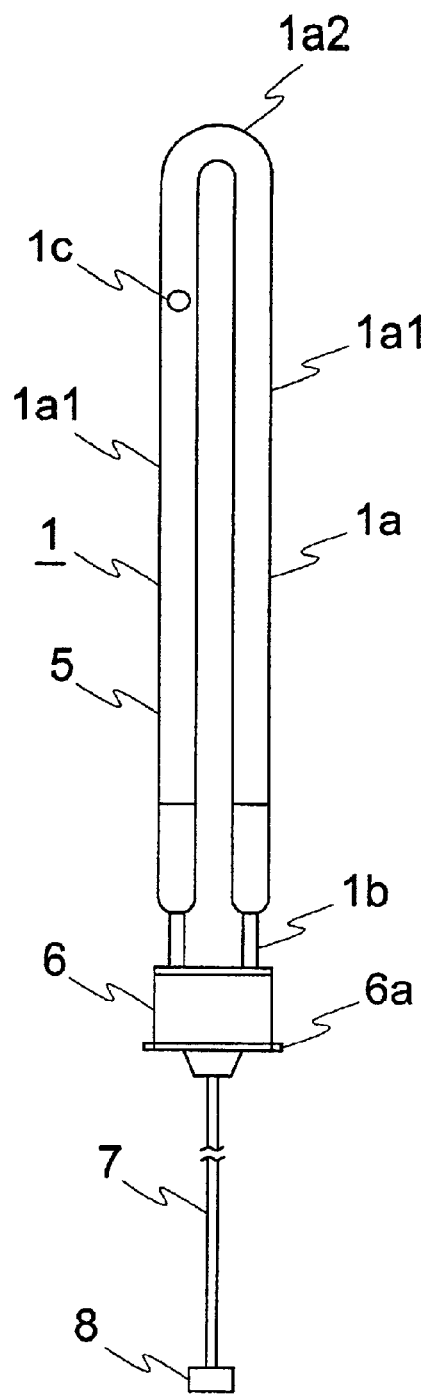
FIG. 1 is a front view of an ultraviolet ray lamp according to a first embodiment of the present invention.

FIG. 1 shows a front view of an ultraviolet ray lamp according to the first embodiment. FIG. 2 shows a side view of the ultraviolet ray lamp shown in FIG. 1. FIG. 3 shows an enlarged longitudinal section of the ultraviolet ray lamp shown in FIG. 1. The ultraviolet ray lamp comprises a U-shaped discharge vessel 1 made of transparent quartz glass. Vessel 1 has a discharge space portion 1$a$ having two straight portion 1$a$1, 1$a$1, and curved portion 1$a$2. Each of seals 1$b$, 1$b$ is formed into flat shape at the ends of the discharge space portion 1$a$. The flat seals 1$b$ face in parallel and are perpendicularly arranged to a plane including the discharge vessel 1.

An exhaust portion 1$c$ is formed in straight portion 1$a$1 about 50 mm from the tip of curved portion 1$a$2. In this example (other configurations are possible), discharge vessel 1 has a length of 152 mm, and a width of 18 mm. The discharge space portion 1$a$ has a 6 mm outer diameter, and a 300 mm inner space length. However, the principles of the invention can be applied to other shapes as well. The quartz glass substantially transmits the ultraviolet rays of the wavelength of 254 nm and 185 nm. This is because the quartz glass does not contain substantial quantities of titanium oxide ($TiO_2$), and cerium oxide ($CeO_2$). The discharge vessel may further comprise a film on the inner surface thereof, which prevents mercury (Hg) of the vessel from permeating the quartz glass. The presence of the film maintains the quantity of mercury (Hg), so that the discharge lamp maintains good light levels throughout its entire life. The film may be made of aluminum oxide ($Al_2O_3$), titanium oxide ($TiO_2$), or rare earth metal, e.g., yttrium oxide.

Electrodes 2 of this embodiment are of the cold cathode type. Each electrode 2 has a coil 2$a$ made of tungsten, an emitter (not shown), and an electrode rod 2$b$ made of tungsten, and is disposed in the discharge vessel 1. A first end of each of electrodes 2 is respectively embedded in its corresponding seal 1$b$ and is connected to a corresponding molybdenum foil 3, embedded in seals 1$b$. Each molybdenum foil 3 is also connected to a corresponding conductive wire 4. A pair of the electrodes may be arranged to the outer surface of the discharge vessel along the vessel.

Although this embodiment describes a vessel arrangement in which there are two electrodes within the discharge vessel, other arrangements are possible. For example, one electrode can be formed as described above and be positioned within the discharge vessel and the other electrode may be arranged outside of the discharge vessel, such as on its outer surface. If an outer electrode is utilized, the outer electrode may be made of a conductive foil, mesh, coil, thin film, or metal oxide film made of ITO including indium oxide ($In_2O_3$), and tin oxide ($SnO_2$).

The discharge vessel 1 has a filling gas, which contains mercury (Hg), and rare gases including argon (Ar) and neon (Ne). The filling gas may contain components that cause there to be generated ultraviolet rays of 185 nm and 254 nm.

An optical filter 5, shown in the Figures as being on the outer surface of vessel 1, is made of zirconium oxide ($ZrO_2$). This filter substantially cuts off ultraviolet rays of short wavelength and allows passage of ultraviolet rays of long wavelength. The filter material is formed on about 85% of the surface area of discharge vessel 1. Furthermore, the optical filter 5 may be mainly made of metal oxide having an energy band gap in the range of 4.5 to 6.7 eV. When the metal oxide has a band gap in this range, the metal oxide can cut off ultraviolet rays of 185 nm or less, and allow those of 254 nm or more to pass. The metal oxide may further comprise another metal oxide, e.g., silicon oxide ($SiO_2$), or aluminum oxide ($Al_2O_3$). Zirconium oxide ($ZrO_2$) is suitable for the optical filter, as zirconium oxide ($ZrO_2$) has a band gap in the range of 4.5 to 6.7 eV, and does not change chemically. The amount of area, e.g., above 85%, of the optical filter 5 correlates with the amount of ozone created by the wavelength of 185 nm inducing an oxygen reaction. That is, ozone increases in inverse proportion to the area covered by the optical filter 5. The ozone can sterilize the air or a liquid.

The optical filer may be formed on at least one surface of the discharge vessel. Also, the optical filter may prevent the vessel from cracking because the filter can cover a flaw, if it has been formed on the surface of the bulb. When the optical filer is formed on the outer surface of the discharge vessel, impurities, generating from the optical filer during the lamp operation, can easily be released to the outside. Generally, it is known that quartz glass tends to reduce its transparency, when it is touched by hand. However, when quartz glass of the discharge vessel is constructed with the optical filer, the transparency of the discharge vessel does not decrease.

The optical filter can be constructed and arranged in various ways. One way to make the filter follows: (1) dipping the discharge vessel 1 into a bath of water containing zirconium oxide having particles of 30 nm average diameter and a surface active agent to form a zirconium oxide layer. (2) baking the discharge vessel having the zirconium oxide layer at the temperature of 450 degrees centigrade in the atmosphere.

If the optical filter of zirconium oxide ($ZrO_2$) is constructed and arranged to further include silicon oxide ($SiO_2$), and aluminum oxide ($Al_2O_3$), the optical filter can be formed at lower temperature of 200 to 300 degrees centigrade. This optical filter becomes strong and has improved optical performance.

A lamp base 6 made of polymers containing fluorine is fixed in the seals 1$b$ with a silicone adhesive agent. Each of lead wires 7 connecting to a respective conductive wire 4 extend from the lamp base 6. The other ends of lead wires 7 are coupled to respective terminals 8. Terminals 8 are connected to a ballast (not shown), e.g., an inverter generating a high frequency power. The lamp base 6 has a flange 6$a$ so that a fixing ring 13 (shown in FIG. 5) can hold the lamp. The ultraviolet ray lamp including the lamp base 6 is about 190 mm length fully assembled. Of course that is true for the specific exemplary embodiment described. Many other structural arrangements are possible.

Figure 4:
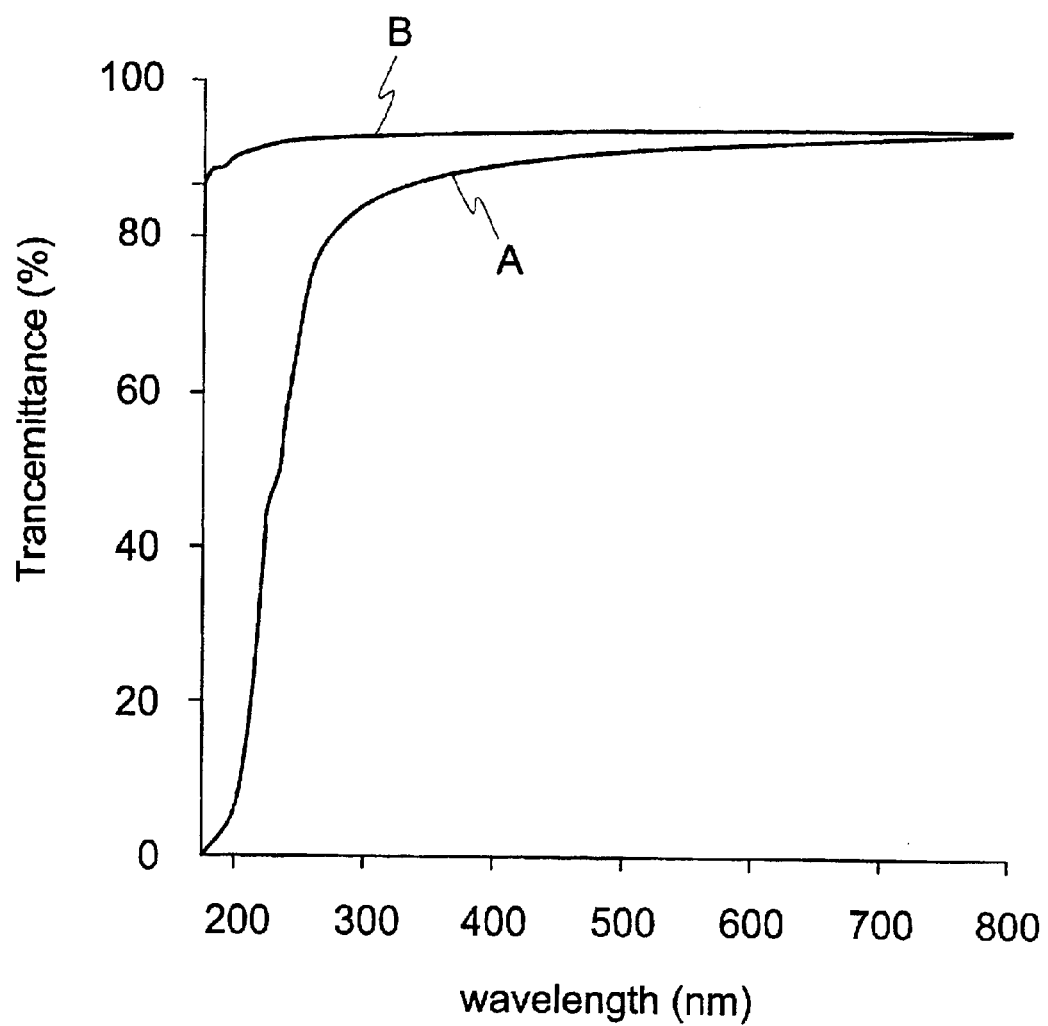
FIG. 4 is a graph showing a transmittance as a function of wavelength of the ultraviolet ray lamp shown in FIG. 1.

FIG. 4 is a graph of transmittance (vertical axis) as a function of wavelength (horizontal axis) of the ultraviolet ray lamp. The vertical axis is calibrated in transmittance (%) as a function of wavelength. The horizontal axis is calibrated in wavelength (nm) of the ultraviolet ray lamp. Line A represents the transmittance of part of the discharge vessel 1 having the optical filter 5. Line B represents the transmittance of part of the discharge vessel 1 not being coated the optical filter 5. According to the line A, the optical filter 5 can substantially cut off ultraviolet rays of 185 nm and transmit almost ultraviolet rays of 254 nm.

Figure 5:
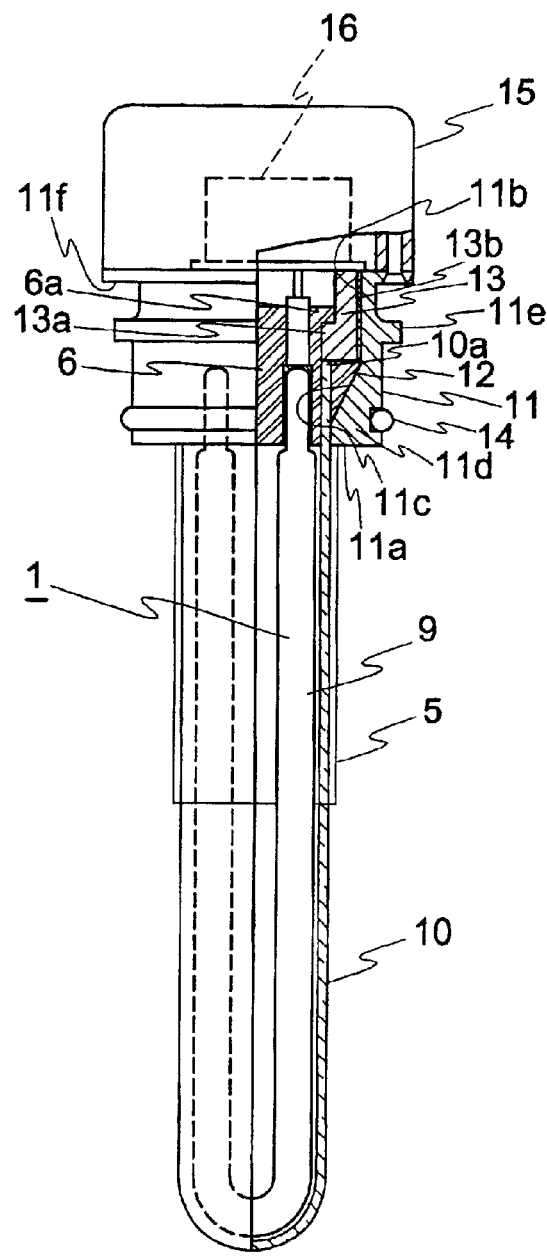
FIG. 5 is a side view, partly in section, of a device for generating ultraviolet rays according to a second embodiment of the present invention.

A second exemplary embodiment of the invention will be explained referring to FIG. 5, which is a side view, partly in section, of a device for generating ultraviolet rays according to the present invention. In this embodiment the same reference numerals refer to like or similar parts to those already described and therefore detailed explanation of those parts will not be provided. In this embodiment, the device for generating ultraviolet rays is provided with an enclosure 10 accommodating a discharge vessel 1. An optical filter 5 is formed not on the discharge vessel 1 (as in the first embodiment), but rather on the enclosure 10. Other elements of an ultraviolet ray lamp 9 are the same as the first embodiment.

A lamp base 6 is inserted into an opening 10a of the enclosure 10 made of transparent quartz glass, and the enclosure 10 is air-tightly sealed with a silicone adhesive agent (not shown). However, the enclosure may define some holes in order to allow a fluid, e.g., liquid or air to pass.

The optical filter 5 made of zirconium oxide, which can substantially cut off ultraviolet rays of short wavelength and transmit ultraviolet rays of long wavelength, is formed on the upper half of enclosure 10. The optical filer may be formed at least on one surface of the enclosure.

For example, let's assume that an arrangement is being provided for sterilizing a liquid. Enclosure 10 is steeped in the liquid to be sterilized. Ultraviolet rays are generated and pass through enclosure 10 steeped in the liquid. These ultraviolet rays have wavelengths of 185 nm and 254 nm because optical filter 5 is not formed on the lower half of the enclosure. The rays of wavelength 185 nm cause oxygen in the liquid to react to create ozone in the liquid. The resulting ozone and the ultraviolet rays of 254 nm effectively sterilize the liquid. The area of enclosure 10 covered by the optical filter 5 can control the amount of ozone generated by controlling the amount of 185 nm ultraviolet radiation. Due to the effectiveness of the optical filter 5, and if the surface level of the liquid is properly selected, this arrangement can prevent the production of ozone in the air.

A holder 11 made of aluminum die-casting includes a lower opening 11a in order to allow the passage of envelope 10, and an upper opening 11b having a screw groove for accommodating fixing ring 13. The inner surface between the openings 11a and 11b is constructed and arranged as an inclined plane 11c. A groove 11d and fixing flange 11e are respectively formed on the middle outer surface of the holder 11. The upper opening 11b also has a supporting flange 11f on the outer side thereof. A ring-shaped seal 12 having a wedge-shaped section is arranged on the inclined plane 11c.

The fixing ring 13 is provided with a holding portion 13a on its inner surface, and a screw 13b on its outer surface. The fixing ring 13 is inserted along the outer surface of the lamp base 6 so as to touch the holding portion 13a to the flange 6a, before the opening 10a of the enclosure 10 is fixed to the lamp base 6 with the silicone adhesive agent. Accordingly, the holding portion 13a of the fixing ring 13 is arranged between the flange 6a and the end of the enclosure 10, so that the fixing ring 13 is fixed. After the ring-shaped sealing 12 is arranged on the inclined plane 11c of the holder 11, the holder 11 is inserted along the surface of the enclosure 10. The screw 13b of the fixing ring 13 is applied to the screw groove of upper opening 11b. Accordingly, the ring-shaped seal 12 is tightly put between the fixing ring 13, holder 11, and a part of the enclosure 10.

An O-shaped ring 14 put into the groove 11d can seal, when the device for generating ultraviolet rays is applied to another apparatus.

A cover 15, which is fixed to the supporting flange 11f by some screws, accommodates a ballast 16, including a high frequency inverter, and other electrical elements.

Figure 6:
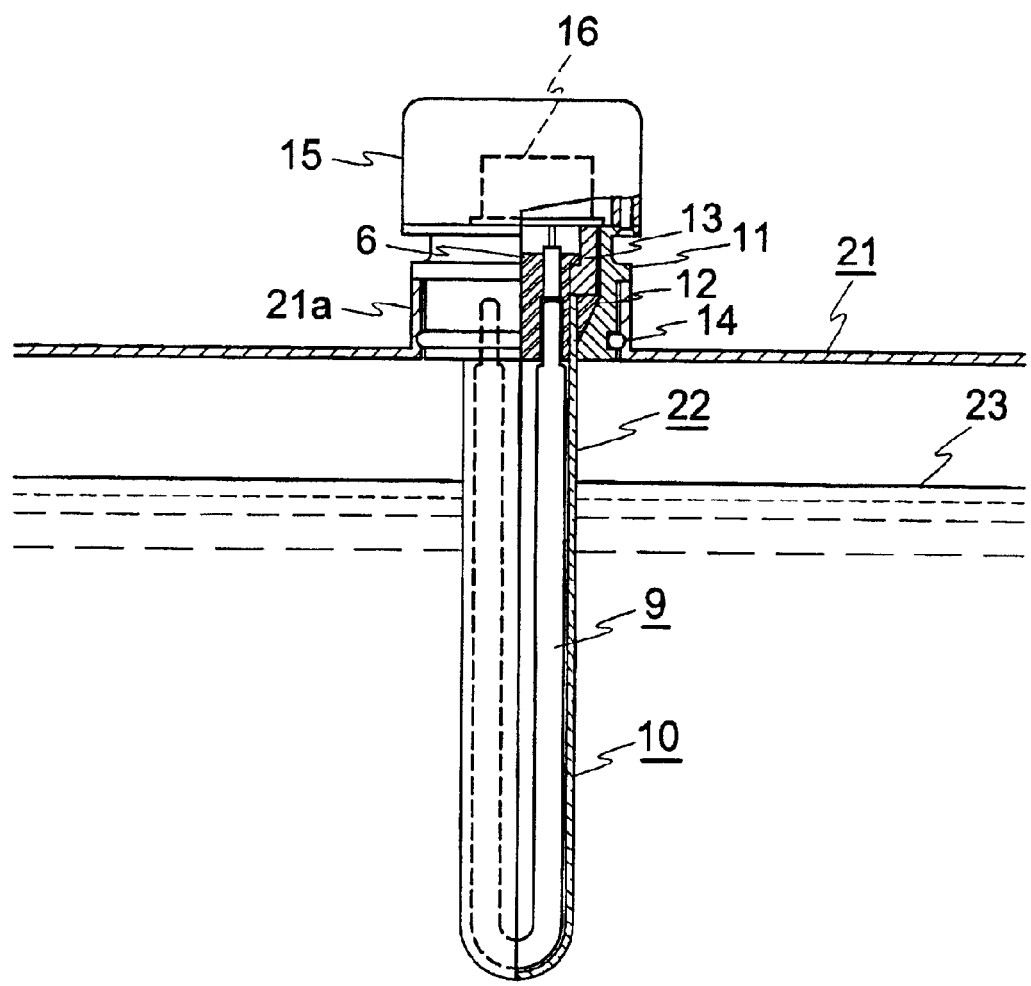
FIG. 6 is a side view, partly in section, of a sterilizer using the device according to the present invention.

FIG. 6 shows a side view, partly in section, of a sterilizer according to the present invention. Like reference numerals designate identical or corresponding to the elements to those described with respect to other embodiments, such as shown in FIG. 5. In this embodiment, the device for generating ultraviolet rays is applied to a sterilizer. The sterilizer comprises a body 21 and the device for generating ultraviolet rays 22. Water 23 including bacteria is to be sterilized. The body 21 filled with water 23, e.g., water, has a cylinder-shaped opening 21a, which fixes the device 22 by inserting the holder 11 having the O-shaped ring 14 of the device 22 into the cylinder-shaped opening 21a. Accordingly, ultraviolet rays generating from the device irradiate fluid, so that the water becomes sterilized.

The body 21 of the sterilizer may further comprise a material for reflecting ultraviolet rays on the inner surface thereof, so that the reflected ultraviolet rays also can sterilize fluid. In this regard, the body 21 may be made of a material, which can effectively reflect ultraviolet rays. The sterilizer may further comprise a photocatalytic member. The sterilizer described in this embodiment may utilize the ultraviolet ray lamp of the first embodiment or some other ultraviolet lamp. In this case, the ultraviolet ray lamp may have a holder to be supported at a body. The body accommodates the ultraviolet ray lamp.

Figure 7:
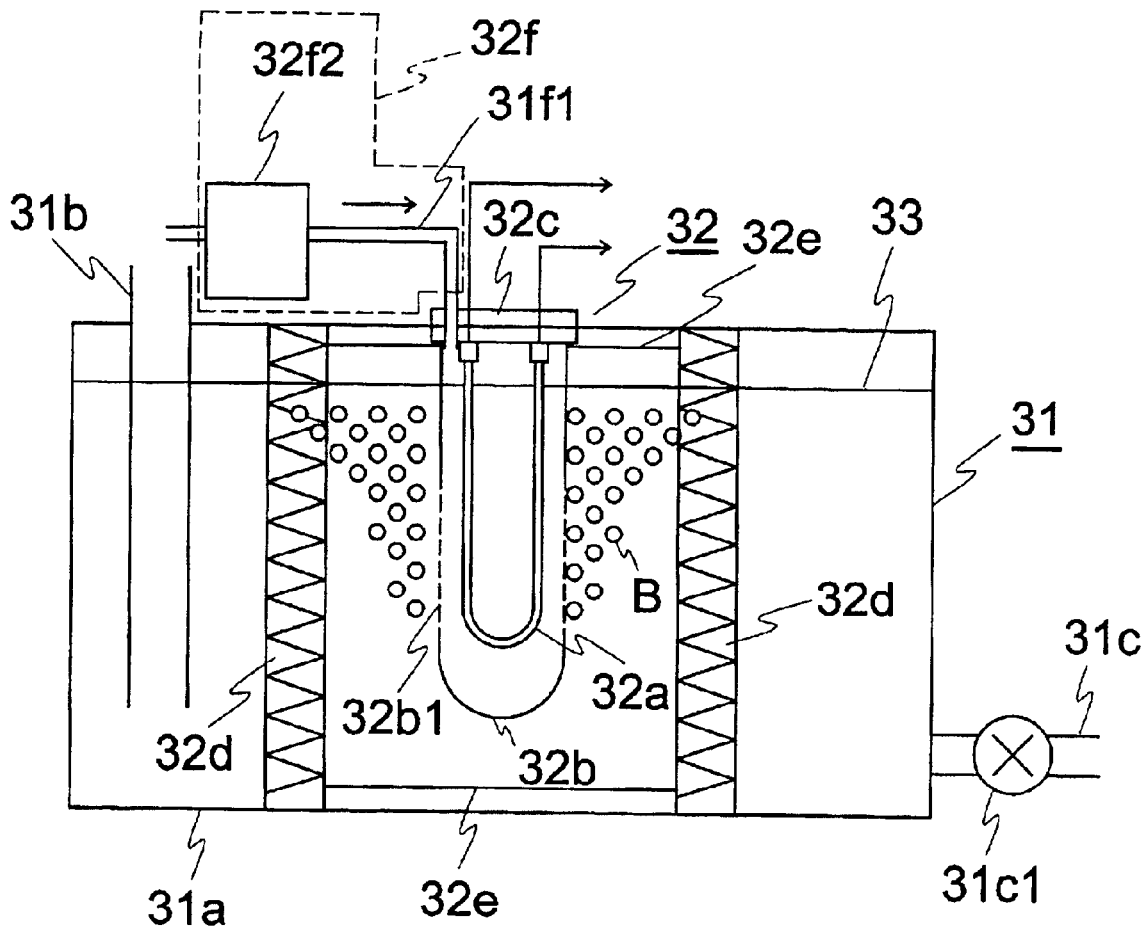
FIG. 7 is a schematic section of an apparatus for treating water according to the present invention.

FIG. 7 is a section, schematically shown, of an apparatus for treating water according to the present invention. The apparatus for treating water 33 comprises a fluid tank 31, and a device 32 for treating the fluid. The apparatus can decompose toxic substances, e.g., tri-chloro-ethylene, poly-chloro-di-benzo-para-di-oxin (PCDD), or choloroform, remove color from an organic-coloring matter, or sterilize.

Tank 31 has a body 31a having an opening (not shown) in order to fix the device 32, a supplying pipe 31b, and a draining pipe 31c connected to tank 31 via a valve 31c1. Fluid is supplied to tank 31 via the supplying pipe 31b, and drained via the draining pipe 31c after the device 32 sterilizes fluid 33.

The treating device 32 comprises an ultraviolet ray lamp 32a, a cylindrical enclosure 32b, a holder 32c, photocatalytic filters 32d, a pair of photocatalytic plates 32e, 32e, and a blower 32f. The ultraviolet ray lamp 32a has a discharge vessel that is not coated with an optical filter as shown in FIG. 5.

The enclosure 32b made of quartz glass, which defines plural holes 32b1 for passing fluid, accommodates the ultraviolet ray lamp 32a. Enclosure 32b forms an optical filter, which can substantially cut off ultraviolet rays of short wavelength, e.g., 185 nm and transmit ultraviolet rays of long wavelength, e.g., 254 nm. For this purpose, it is made with a sufficient amount of zirconium oxide.

The holder 32c supports the ultraviolet ray lamp 32a, and the enclosure 32b together.

Photocatalytic filters 32d, which have a photocatalytic layer made of titanium oxide, are arranged on both sides of the ultraviolet ray lamp 32a so as to be passed through water 33 being supplied via the supplying pipe 31b.

Photocatalytic plates 32e, which forms a photocatalytic layer made of titanium oxide on the inner surface thereof, are arranged at the upper and lower sides of tank body 31a. The upper side photocatalytic plate 32e supports the holder 32c of the ultraviolet ray lamp 32a.

The blower 32f comprises a pump 32f2, and a supplying pipe 32f1 connected to the enclosure 32b. Air is generated by pump 32f2 and is supplied to the enclosure 32b via the supplying pipe 32f1 as represented by the arrow in FIG. 7.

The ultraviolet ray lamp 32a irradiates ultraviolet rays of wavelength of 254 nm and 185 nm. The wavelength of 254 nm sterilizes water 33 and also activates the photocatalytic materials of the photocatalytic filters 32d, and the photocatalytic plates 32e. The photocatalytic materials remove or decompose harmful-organic ingredients of fluid 33. The wavelength of 185 nm reacts on oxygen, which is supplied by air supplied by pump 32f2, so that ozone is generated in the enclosure 10. Ozone and air indicated as B flow into water 33 via holes 32b1, so that ozone removes or decomposes harmful-organic ingredients of fluid 33. In this embodiment, ultraviolet rays, ozone, and the photocatalytic material can decompose water sufficiently and efficiently.

Figure 8:
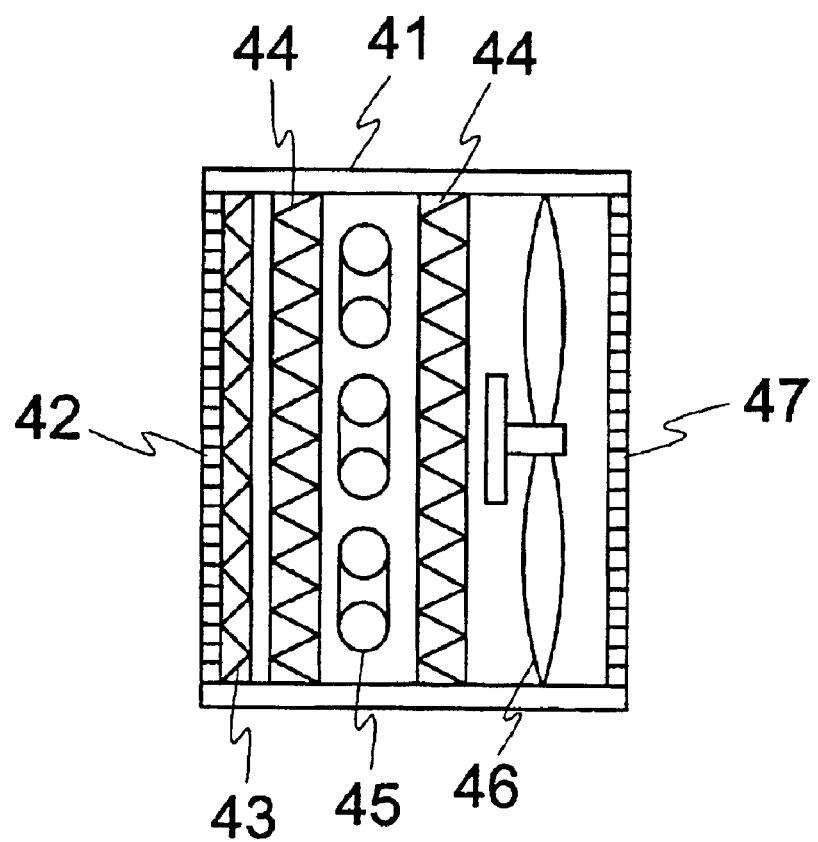
FIG. 8 is a schematic section of an air cleaner using the ultraviolet ray lamp according to the present invention.

FIG. 8 is a schematic section of an air cleaner according to the present invention. The air cleaner includes ultraviolet ray lamps 45, photocatalytic member 44, e.g., photocatalytic filters, a blower 46 making an airflow, and a case 41 including an intake 42 and an exhaust 47. A filter 43 is also arranged between the intake 42 and the photocatalytic filter 44, and removes dust from the air. The ultraviolet ray lamps 45, having an optical filter on a discharge vessel, can be the same as described with respect to the first embodiment. The optical filter made of zirconium oxide, which can substantially cut off ultraviolet rays of short wavelength and transmit ultraviolet rays of long wavelength, is formed on the surface area of 85% of the discharge vessel. The area, e.g., above 85%, of the optical filter can easily control the quantity of ozone created by the wavelength of 185 nm reacting on oxygen.

Photocatalytic filters 44, which comprises a substance such as filter and photocatalytic material made of titanium oxide on the surface of the filter, are arranged to both sides of the ultraviolet ray lamps 45. As the photocatalytic filter 44 includes many fibers and photocatalytic materials adhered to the fibers, air including dust can contact many photocatalytic materials. Therefore, the photocatalytic materials remove or decompose effectively harmful-organic ingredients of air. The photocatalytic member may be formed from a suitable photocatalytic material. The substance having the photocatalytic material is made of an inorganic material, e.g., a glass, a metal, or a ceramics, which is not easily decomposed by the photocatalytic material. However, when an organic material, e.g., a paper, urethane resin, polyester, or fluorine-contained polymers is applied to the substance having photocatalytic material, it had better insert an inorganic material layer between the organic material and the photocatalytic material so as not to decompose the substance. Furthermore, in case of applying the organic material to the substance, the photocatalytic material may be formed into a spherical shape, so that the organic substance can contact to the photocatalytic material at small area. Accordingly, the organic substance is hardly decomposed by the photocatalytic material at the contacting area.

The photocatalytic material may be one or more selected from a group of titanium oxide ($TiO_2$), tungsten oxide ($WO_3$), lanthanum rhodium phosphorus ($LaRhP_3$), iron titanium oxide ($FeTiO_3$), iron oxide ($Fe_2O_3$), cadmium di-iron oxide ($CdFe_2O_4$), strontium titanium oxide ($SrTiO_3$), cadmium selenium (CdSe), gallium arsenic (GaAs), gallium phosphide (GaP), ruthenium oxide ($RuO_2$), zinc oxide (ZnO), cadmium sulfide (CdS), molybdenum sulfide ($MoS_3$) or ($MoS_2$), lanthanum rhodium oxide ($LaRhO_3$), cadmium iron oxide ($CdFeO_3$), bismuth oxide ($Bi_2O_3$), indium oxide ($In_2O_3$), cadmium oxide (CdO), and tin oxide ($SnO_2$). The absolute reduction-oxidation potential of the band gap of photocatalytic material, which is titanium oxide ($TiO_2$), tungsten oxide ($WO_3$), strontium titanium oxide ($SrTiO_3$), iron oxide ($Fe_2O_3$), cadmium sulfide (CdS), molybdenum sulfide ($MoS_3$) or ($MoS_2$), bismuth oxide ($Bi_2O_3$), indium oxide ($In_2O_3$), or cadmium oxide (CdO), is larger than that of the conduction band. Therefore, these photocatalytic materials can effectively decompose the organic compound, so that can remove odor ingredients, pollution, or bacteria. Iron oxide ($Fe_2O_3$), and zinc oxide (ZnO) are less expensive than the others. Titanium oxide ($TiO_2$) has crystal forms of anatase and rutile structure. The anatase structure of titanium oxide ($TiO_2$) has more effective photocatalysis than the rutile structure. The ultraviolet ray lamps 45 irradiate ultraviolet rays of wavelength of 254 nm and 185 nm. The wavelength of 254 nm sterilizes air and also activates the photocatalytic materials of the photocatalytic filters 44. The photocatalytic materials remove or decompose harmful-organic ingredients of air. The wavelength of 185 nm irradiates through a discharge vessel not being coated the optical filter. The wavelength of 185 nm reacts on oxygen, which is supplied by air from the blower 46, so that ozone occurs. Ozone also removes or decomposes harmful-organic ingredients of air. The air cleaner can clean air by means of removing or decomposing including bacteria, odor, or pollution. In this embodiment, ultraviolet rays, ozone, and the photocatalytic material can decompose air sufficiently.

What is claimed is:

1. An ultraviolet ray lamp comprising:

a discharge vessel made of quartz glass having a filling gas therein;

a pair of electrodes constructed and arranged to generate a discharge in the discharge vessel; and an optical filter including a metal oxide, which is formed on part of the outer surface of the discharge vessel, transmitting ultraviolet rays having a wavelength of 254 nm or more and blocking ultraviolet rays having a wavelength of 185 nm or less.

2. An ultraviolet ray lamp according to claim 1, wherein the quartz glass does not contain substantial amounts of titanium oxide and cerium oxide.

3. An ultraviolet ray lamp according to claim 1, wherein the optical filter has an energy band gap of 4.5 to 6.7 eV.

4. An ultraviolet ray lamp according to claim 1, wherein the optical filter comprises zirconium oxide.

* * * * *